US011757703B1

(12) United States Patent
Hotinger et al.

(10) Patent No.: US 11,757,703 B1
(45) Date of Patent: Sep. 12, 2023

(54) ACCESS REQUESTS PROCESSING AND FAILOVER HANDLING ACROSS MULTIPLE FAULT TOLERANCE ZONES

(71) Applicant: Amazon Technologies, Inc., Seattle, WA (US)

(72) Inventors: Eric Ray Hotinger, Redmond, WA (US); Kathiravan Kalimuthu, San Jose, CA (US); Arvind Jayasundar, Belmont, CA (US); Chao Duan, Seattle, WA (US); Ippokratis Pandis, Menlo Park, CA (US); Hitenkumar Sonani, Fremont, CA (US); Davide Pagano, Watsonville, CA (US); Yousuf Hussain Syed Mohammad, Seattle, WA (US); Bruce William McGaughy, Mercer Island, WA (US); Bin Zhang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/937,427

(22) Filed: Sep. 30, 2022

(51) Int. Cl.
*H04L 41/0663* (2022.01)
*H04L 9/08* (2006.01)
*H04L 41/0604* (2022.01)

(52) U.S. Cl.
CPC ........ *H04L 41/0663* (2013.01); *H04L 9/0825* (2013.01); *H04L 41/0627* (2013.01)

(58) Field of Classification Search
CPC ... H04L 9/0825; H04L 9/0627; H04L 9/0663; H04L 43/08; H04L 67/1097; H04L 67/563; H04L 69/40; H04L 41/145; G06F 11/2028; G06F 11/2056; G06F 12/128; H06F 16/2343; H06F 16/26
See application file for complete search history.

(56) References Cited

U.S. PATENT DOCUMENTS

| | | | |
|---|---|---|---|
| 7,392,421 B1 * | 6/2008 | Bloomstein | G06F 11/2028 714/4.4 |
| 8,856,589 B1 * | 10/2014 | Glade | G06F 11/2056 714/13 |
| 9,152,666 B2 * | 10/2015 | Lin | G06F 16/2343 |
| 9,229,707 B2 | 1/2016 | Borissov et al. | |
| 2008/0098046 A1 | 4/2008 | Alpern et al. | |
| 2018/0121304 A1 * | 5/2018 | Liaw | G06F 12/128 |

(Continued)

*Primary Examiner* — Le H Luu
(74) *Attorney, Agent, or Firm* — S. Scott Foster; Kowert, Hood, Munyon, Rankin & Goetzel, P.C.

(57) ABSTRACT

A database service may distribute resources across different geographic locations or other infrastructures to increase availability of the resources and may provide multiple locations to access resources and isolate failure of resources to a respective location or infrastructure. The processing resources in differing fault tolerance zones may be able to continue operating in the event of an outage impacting an entire fault tolerance zone. The database service may generate a supporting processing cluster in the differing fault tolerance zone that handles at least a portion of the access requests of an initial processing cluster. The database service may provision the supporting processing cluster in a separate fault tolerance zone that has a similar capacity and may provision and maintain the cluster in order to preclude the potential of not having sufficient capacity to recover upon failure of a single fault tolerance zone.

20 Claims, 11 Drawing Sheets

(56) References Cited

U.S. PATENT DOCUMENTS

| | | | |
|---|---|---|---|
| 2018/0314750 A1* | 11/2018 | Merriman | H04L 67/1097 |
| 2020/0125662 A1* | 4/2020 | Zhu | H04L 69/40 |
| 2020/0287927 A1* | 9/2020 | Zadeh | H04L 43/08 |
| 2020/0301947 A1 | 9/2020 | Botev et al. | |
| 2021/0027503 A1* | 1/2021 | Kumaresan | G06F 16/26 |
| 2021/0176328 A1* | 6/2021 | Brasetvik | H04L 67/563 |
| 2021/0320853 A1* | 10/2021 | Kulshreshtha | H04L 41/145 |

* cited by examiner

ACCESS REQUESTS PROCESSING AND FAILOVER HANDLING ACROSS MULTIPLE FAULT TOLERANCE ZONES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, increasing amounts of data that organizations must store and manage often correspondingly increase both the size and complexity of the data storage and management technologies, such as database systems, which in turn escalate the cost of maintaining the information.

New technologies more and more seek to reduce both the complexity and storage requirements of maintaining data while simultaneously improving the efficiency of data processing. For example, data processing resources may be efficiently configured to perform different workloads. Moreover, new technologies may seek to increase availability of the resources and provide protection from outages. Obtaining the right configuration of data processing resources and increasing availability of the resources presents a non-trial challenge.

Figure 1:
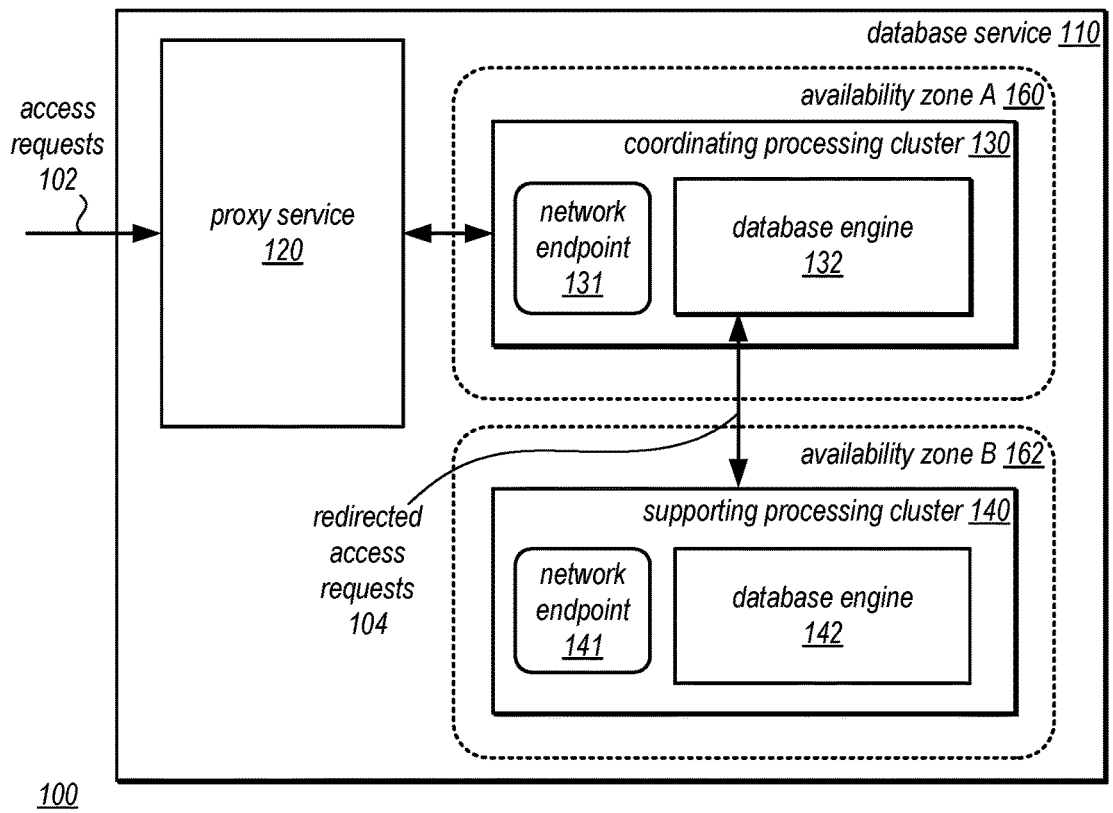
FIG. 1 illustrates a logical block diagram of multiple processing clusters in different fault tolerance zones that receive access requests via a single endpoint and allow shared processing of access requests and enable failover handling, according to some embodiments.
Figure 1:
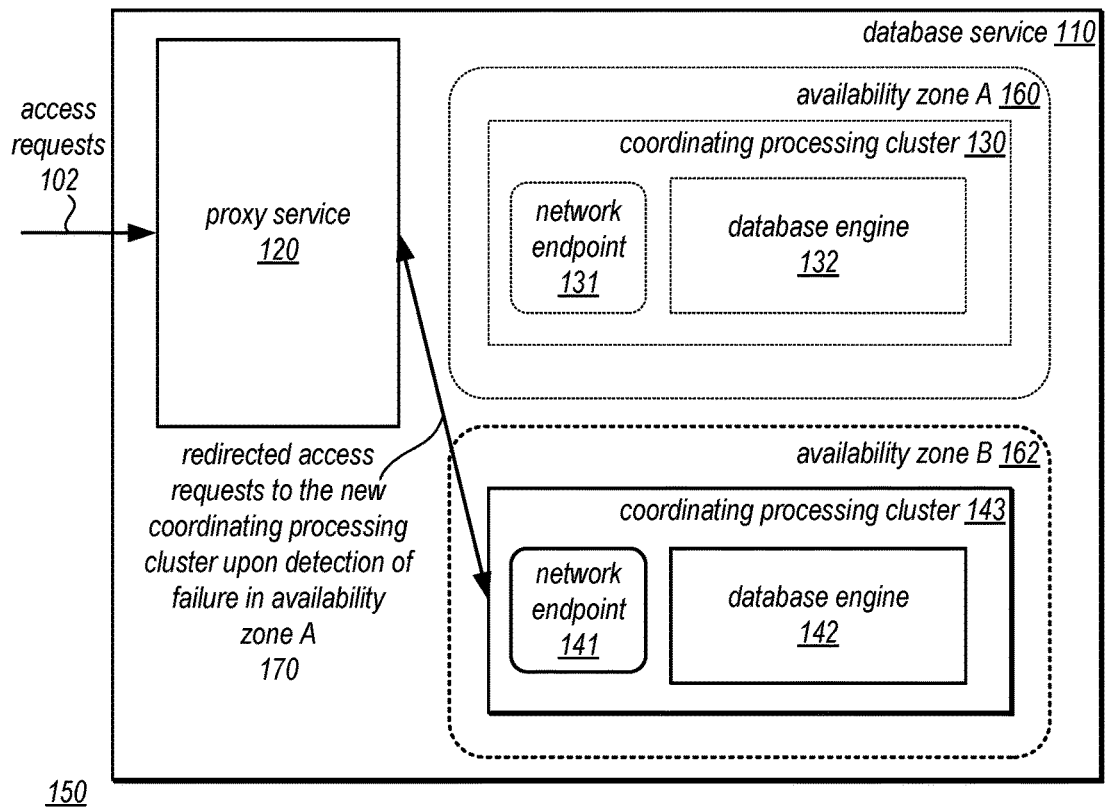

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of enabling multiple processing resources in different fault tolerance zones that receive access requests via a single endpoint and allow shared processing of access requests and enable failover handling are described herein. In order to increase an availability of access requests to a database, a database service may distribute resources across different geographic locations or other infrastructures. Such distribution across multiple locations or infrastructures, may increase availability of the resources, and may provide multiple locations to access resources and opportunities to isolate failure of resources to a respective location or other infrastructure. For example, processing resources in different fault tolerant zones may be offered by service providers, or other systems, that allow customers, users, or other clients of a service provider to process access requests to a database. These processing resources, such as processing cluster(s) in differing fault tolerance zones, discussed below with regard to FIG. 2, may leverage the resources that are deployed in multiple fault tolerance zones to process access requests to a database despite a failure or an outage of one or more of the fault tolerance zones. The database service may, leveraging the failover handling, be able to continue operating in the event of an outage impacting an entire fault tolerance zone. In some embodiments, the database service may receive request to enable the multiple fault tolerance zone feature, and upon receipt of the request, generate a supporting processing cluster that handles the access requests of an initial processing cluster. In some embodiments, the database service may provision the supporting processing cluster in a separate fault tolerance zone that has a similar capacity and may provision the cluster in order to preclude the potential of not having sufficient capacity to recover upon failure of a single fault tolerance zone. The database service may provision the capacity initially upon receiving the request to enable multiple fault tolerance zone feature. In some embodiments, the database service may configure the supporting processing cluster to maintain similar capacity and/or topology of the coordinating processing cluster.

Moreover, instead of remaining idle, in some embodiments, the database service may enable the initial processing cluster to be a coordinating processing cluster and enable shared processing of the access requests between the coordinating and supporting processing clusters. The processing clusters in different fault tolerance zones may be usable at all times and would enable a shared processing of access requests and may thereby allow full operation across the fault tolerance zones in an active-active fashion for any access requests, including both read and write operations. In some embodiments, the access requests may be received by a single endpoint of a coordinating processing cluster and once received, a database engine of the coordinating cluster may enable shared processing to occur automatically without requiring additional management from the requester. When the failed fault tolerance zone becomes available, the database service may automatically re-configure the processing resources to be spread across the multiple fault tolerance zones once again. In some embodiments, the supporting processing cluster may become the new coordinating processing cluster and provision another supporting processing cluster.

FIG. 1 illustrates a logical block diagram of multiple processing clusters in different fault tolerance zones that receive access requests via a single endpoint and allow shared processing of access requests and enable failover handling, according to some embodiments. A database service 110 may be a stand-alone database service, in various embodiments. For example, database service 110 may be implemented for private use (e.g., on private networks and resources for entity-specific utilization). In some embodiments, the database service 110 may be implemented as part of multiple different services provided by a cloud service provider, such as provider network 200 discussed in detail below with regard to FIG. 2.

The database service 110 may manage one or more databases on behalf of clients of the database service 110, in various embodiments. For example, the database service 110 may implement an interface that allows users to create a database to be hosted in database service 110. The interface may also allow users to specify whether the database is to be managed by the database service, automatically, in a "serverless" fashion (e.g., by allowing the database service 110 to automatically determine and configure an appropriate number of computing resources to host and provide access to (e.g., query) the database). In some embodiments, the database service 110 may also allow for hosted databases to be manually managed (e.g., via interface requests to configure a specified number of computing resources to host and provide access to (e.g., query) the database).

In some embodiments, for database service managed databases, the database service 110 may implement a proxy service 120. The proxy service 120, which may be similar to proxy service 240 discussed in detail below with regard to FIG. 2, may host or implement a network endpoint, which may be used to provide database access 102 to a database managed by the database service 110. In embodiments where a proxy is used, instead of direct access, a client application utilizing a managed database may send requests to a common network endpoint of the proxy associated with the database. In some embodiments, the client application utilizing the managed database may send requests to directly to a network endpoint 131 of a coordinating processing cluster 130.

In some embodiments, the coordinating processing cluster 130 for a database may act as a proxy for other processing clusters attached or otherwise assigned to handling database access 102. Thus, the various features discussed above with regard to proxy service 120 may be implemented instead on a coordinating processing cluster (e.g., at a leader node for the coordinating processing cluster).

Processing clusters, such as coordinating processing cluster 130 and supporting processing cluster 140 may implement distributed query and other access request processing frameworks to access data in a database hosted by database service 110, as discussed in detail below with regard to FIG. 4. The processing clusters may be capable of taking on either role as coordinating or supporting clusters and may implement a database engine 132 and 142 to plan and direct execution of requests. In some embodiments, the database engines 132 and 142 may be implemented on leader nodes to perform various data operations to execute the requests using compute node(s).

In some embodiments, the coordinating processing cluster 130 and supporting processing cluster 140 may be in differing fault tolerance zones or "availability zones." For example, the coordinating processing cluster 130 may be in availability zone A 160 and the supporting processing cluster 140 may be in availability zone B 162. Fault tolerance zones, such as availability zones A 160 and availability zone B 162, for instance, may be implemented as different data centers (or collections of data centers). The different availability zones may be implemented as different data centers as having different geographic regions, hardware, such as different server racks, different sources of power, different communication channels (e.g., different networks), different environmental controls (e.g., separate rooms of a data center with different cooling systems), or any other infrastructure that limits a type of failure (e.g., power, network, environmental, etc.) from affecting other fault tolerance zones, in various embodiments. Fault tolerance zones may be implemented as part of a private system (e.g., that executes one or more on-premises applications executing on privately operated data centers) or may be implemented as part of a service provider, such as discussed below with regard to FIG. 2.

In some embodiments, at a first scene 100, the proxy service 120 may receive access requests 102 which may be processed by the coordinating processing cluster 130 via the proxy service, or in some embodiments, the requests may be received by the network endpoint 131 directly. The database engine 132 may redirect at least a portion of the access requests to be processed by the supporting processing cluster 140. The processing clusters in different fault tolerance zones, such as the coordinating processing cluster 130 and supporting processing cluster 140, may be usable at all times and would enable shared processing of access requests and allow full operation across the fault tolerance zones in an active-active fashion for access requests, as discussed in detail below with regard to FIG. 5.

In some embodiments, at a second scene 150, the coordinating processing cluster 130 at availability zone A 160 may become unavailable due to one or more failures at its availability zone. Upon detection of the failure, the database service 110 may be configured to handle a failover to the supporting processing cluster 140 and transform the supporting processing cluster 140 to a new coordinating processing cluster 143. The database engine 132 may send the redirected access requests 170 to the new coordinating processing cluster 143 upon detection of failure in availability zone A 160, as discussed in detail below with regard to FIG. 7. In some embodiments, the new coordinating processing cluster 143 in the availability zone B 162 may be provisioned to have similar capacity to preclude the potential of not having sufficient capacity to recover upon failure of the first availability zone. The database service may provision the capacity initially upon receiving the request to enable multiple fault tolerance zone feature. In some embodiments, the database service may configure the supporting processing cluster to maintain similar capacity and/or topology of the coordinating processing cluster to be able to handle failovers, as discussed in detail below with regard to FIG. 8.

Please note that the previous description of a database service is a logical description and thus is not to be construed as limiting as to the implementation of a database service, proxy service, processing clusters, or portions thereof. This specification continues with a general description of a provider network that implements multiple different services, including a database service and storage service, which may implement provisioning supporting processing resources in a different fault tolerance zone to enable shared processing of access requests, and enable failover handling for databases managed by the database service. Then various examples of the database service and the storage service, including different components/modules, or arrangements of components/module that may be employed as part of implementing the services, are discussed. A number of different methods and techniques to implement provisioning the supporting processing resources in a different fault tolerance zone to enable shared processing of access requests and enable failover handling for managed databases are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
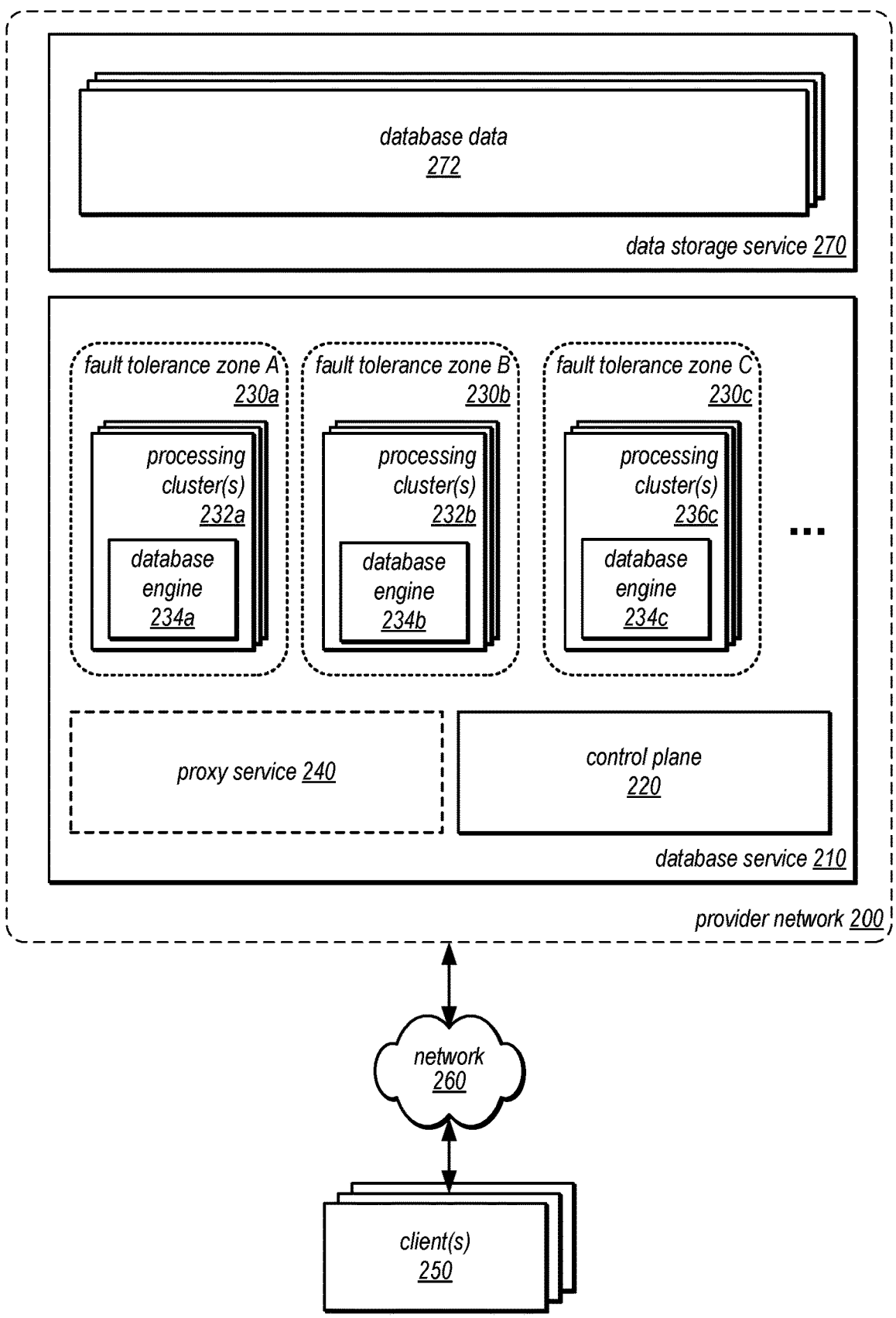
FIG. 2 is a logical block diagram illustrating a provider network offering a database service that provisions multiple processing resources in different fault tolerance zones, and allow shared processing of access requests, and enable failover handling for databases managed by the database service, according to some embodiments.

FIG. 2 is a logical block diagram illustrating a provider network offering a database service that provisions multiple processing resources in different fault tolerance zones, and allow shared processing of access requests, and enable failover handling for databases managed by the database service, according to some embodiments. Provider network 200 may be a private or closed system or may be set up by an entity such as a company or a public sector organization to provide one or more services (such as various types of cloud-based storage) accessible via the Internet and/or other networks to clients 250.

Provider network 200 may be implemented in a single location or may include numerous data centers hosting various resource pools, such as collections of physical and/or virtualized computer servers, storage devices, networking equipment and the like (e.g., computing system 1100 described below with regard to FIG. 11), needed to implement and distribute the infrastructure and storage services offered by the provider network 200. The provider network 200 can be formed as a number of regions, where a region is a separate geographical area in which the cloud provider clusters data centers. Each region can include two or more fault tolerance zones connected to one another via a private high-speed network, for example a fiber communication connection.

A fault tolerance zone (also known as an availability zone, availability domain, or simply a "zone") refers to an isolated failure domain including one or more data center facilities with separate power, separate networking, and separate cooling from those in another fault tolerance zone. Preferably, fault tolerance zones within a region are positioned far enough away from one other that the same natural disaster should not take more than one fault tolerance zone offline at the same time. Customers can connect to fault tolerance zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components are typically implemented on a separate set of servers from the data plane servers, while other control plane components may share the virtualized servers with the data plane, and control plane traffic and data plane traffic may be sent over separate/distinct networks.

In some embodiments, provider network 200 may implement various computing resources or services, such as database service(s) 210, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of database service 210 or data storage service 270) may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., anomaly detection, machine learning, data mining, big data querying, or any other type of data processing operation). For example, in at least some embodiments, database services 210 may include a map reduce service that creates clusters of processing nodes that implement map reduce functionality over data stored in the map reduce cluster as well as data stored in data storage service 270. In another example, database service 210 may include various types of database services (both relational and non-relational) for storing, querying, and updating data. Such services may be enterprise-class database services that are highly scalable and extensible. Access requests may be directed to a database in the data database service 210 that is distributed across multiple physical resources, and the database service may be scaled up or down on an as needed basis.

Database service 210 may work effectively with database schemas of various types and/or organizations, in different embodiments. In some embodiments, clients/subscribers may submit queries in a number of ways, e.g., interactively via an SQL interface to the database service. In other embodiments, external applications and programs may submit queries using Open Database Connectivity (ODBC) and/or Java Database Connectivity (JDBC) driver interfaces to the database service. For instance, database service 210 may implement, in some embodiments, a data warehouse service, that utilizes another data processing service, to execute portions of queries or other access requests with respect to data that is stored in a remote data store, such as data storage service(s) 270 (or a data store external to provider network 200) to implement distributed data processing for distributed data sets.

In at least some embodiments, database service 210 may be a data warehouse service. Thus, in the description that follows database service 210 may be discussed according to the various features or components that may be implemented as part of a data warehouse service, including control plane 220, proxy service 240, and processing clusters 232 stored at different fault tolerance zones 230. For example, a processing cluster(s) 232a in a fault tolerance zone A 230a, processing cluster(s) 232b in a fault tolerance zone B 230b, processing cluster(s) 232c in a fault tolerance zone C 230c may be implemented as part of the database service 210. Note that such features or components may also be implemented in a similar fashion for other types of database services and thus the following examples may be applicable to other types of database service 210. Database service 210 may implement one (or more) processing clusters that are attached to a database (e.g., a data warehouse). In some embodiments, these processing clusters may be designated as a coordinating and supporting (or concurrent, additional, or burst processing clusters) that perform queries to an attached database warehouse.

In embodiments where database service 210 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database service implemented as a data warehouse. However, various versions of the components discussed below as may be equally adapted to implement embodiments for various other types of relational database services, such as row-oriented database services. Therefore, the following examples are not intended to be limiting as to various other types or formats of database services.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (e.g., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1100 described below with regard to FIG. 11. Different subsets of these computing devices may be controlled by control plane 220. Control plane 220, for example, may provide a cluster control interface to clients or users who wish to interact with the processing clusters, such as processing cluster(s) 232a, 232b, and 232c different fault tolerance zones 230a, 232b, and 232c managed by control plane 220. For example, control plane 220 may generate one or more graphical user interfaces (GUIs) for clients, which may then be utilized to select various control functions offered by the control interface for the processing clusters 232 hosted in the database service 210. Control plane 220 may provide or implement access to various metrics collected for the performance of different features of database service 210, including processing cluster performance, in some embodiments.

As discussed above, various clients (or customers, organizations, entities, or users) may wish to store and manage data using a database service 210. Database engine 234a, 234b, and 234c of the respective processing cluster(s) 232a, 232b, and 232c may respond to various access requests, including write/update/store requests (e.g., to write data into storage) or queries for data (e.g., such as a Server Query Language request (SQL) for particular data), as discussed below with regard to FIG. 4. For example, multiple users or clients may access a processing cluster to obtain data warehouse services.

For databases manually managed by users, database service 210 may provide network endpoints directly to the clusters which allow the users manage in order to implement client applications that send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters.

In some embodiments, database service 210 may implement proxy service 240 to provide access to databases (e.g., data warehouses) hosted in database service 210. For databases managed by database service 210, database service 210 may provide database endpoints (e.g., network endpoints) for a hosted database. In embodiments that uses a proxy service 240, database endpoints may not provide direct access to a particular processing cluster 232, as the processing cluster used to respond to such requests (e.g., queries) may change according to various scaling techniques. Instead, client applications may utilize the database endpoint for a database to be included in various client applications or other communications for database access so that proxy service 240 can direct the requests to the appropriate processing cluster without the client application having to be altered every time a change in processing cluster (e.g., scaling operations) are performed by database service 210. In this way, database service 210 can perform scaling and other management operations without interfering with client applications. In embodiments that does not use a proxy service 240, database endpoints may provide direct access to a particular processing cluster 232 and its database endpoint.

Processing clusters, such as processing clusters 232a, 232b, and 232c, in different fault tolerance zones 230a, 232b, and 232c hosted by database service 210 may provide an enterprise-class database query and management system that allows users to send data processing requests to be executed by the clusters 232, such as by sending a query. Processing clusters 232 may perform data processing operations with respect to data stored locally in a processing cluster, as well as remotely stored data. For example, data storage service 270 implemented by provider network 200 that stores remote data, such as backups or other data of a database stored in a cluster. In some embodiments, database data 272 may not be stored locally in a processing cluster 232 but instead may be stored in data storage service 270 (e.g., with data being partially or temporarily stored in processing cluster 232 to perform queries). Queries sent to a processing cluster 23 (or routed/redirect/assigned/allocated to processing cluster(s)) may be directed to local data stored in the processing cluster and/or remote data. Therefore, database engine 234 of the processing clusters 232 may implement local data processing, such as local data processing, (discussed below with regard to FIG. 5) to plan and execute the performance of queries with respect to local data in the processing cluster, as well as a remote data processing client. The different processing cluster(s) and its supporting processing clusters may be made exclusively assigned or allocated for the use of performing queries to the attached database, in some embodiments. The number of processing clusters 232 attached to a database may change over time according to the selection techniques discussed below.

In some embodiments, database service 210 may have at least one processing cluster attached to a database, which may be the "coordinating cluster." Coordinating clusters may be reserved, allocated, permanent, or otherwise dedicated processing resources that store and/or provide access to a database for a client, in some embodiments. Coordinating clusters, however, may be changed. For example, a different processing cluster may be attached to a database and then designated as the coordinating database (e.g., allowing an old coordinating cluster to still be used as a "supporting" processing cluster or released to a pool of processing clusters made available to be an attached to a different database). Techniques to resize or change to a different configuration of a coordinating cluster may be performed, in some embodiments. Control plane 220 may manage cluster pools by managing the size of cluster pools (e.g., by adding or removing processing clusters based on demand to use the different processing clusters). Control plane 220 may further manage synchronization or configuration of the coordinating/supporting processing cluster pairs, as further discussed in FIG. 8.

As databases are created, updated, and/or otherwise modified, snapshots, copies, or other replicas of the database at different states may be stored separate from database service 210 in data storage service 270, in some embodiments. For example, a leader node, or other processing cluster component, may implement a backup agent or system that creates and store database backups for a database to be stored as database data 272 in data storage service 270. Database data 272 may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data 272 may be maintained in some embodiments, so that the latest database data 272 may, for instance, be obtained by a processing cluster in order to perform queries. In at least some embodiments, database data 272 may be treated as the authoritative version of data, and data stored in processing clusters 232 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 270 may be treated as a data lake. For example, an organization may generate many different kinds of data, stored in one or multiple collections of data objects in a data storage service 270. The data objects in the collection may include related or homogeneous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, format independent data processing service 220 may access data objects stored in data storage services via the programmatic interfaces.

Generally speaking, clients 250 may encompass any type of client that can submit network-based requests to provider network 200 via network 260, including requests for storage services (e.g., a request to query a database service 210, or a request to create, read, write, obtain, or modify data in data storage service(s) 270, etc.). For example, a given client 250 may include a suitable version of a web browser or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) 210 to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s) 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. In some embodiments, clients of data processing services 210 and/or data storage service(s) 270 may be implemented within provider network 200 (e.g., an application hosted on a virtual computing resource that utilizes a data processing service 210 to perform database queries) to implement various application features or functions and thus various features of client(s) 250 discussed above may be applicable to such internal clients as well.

Figure 3:
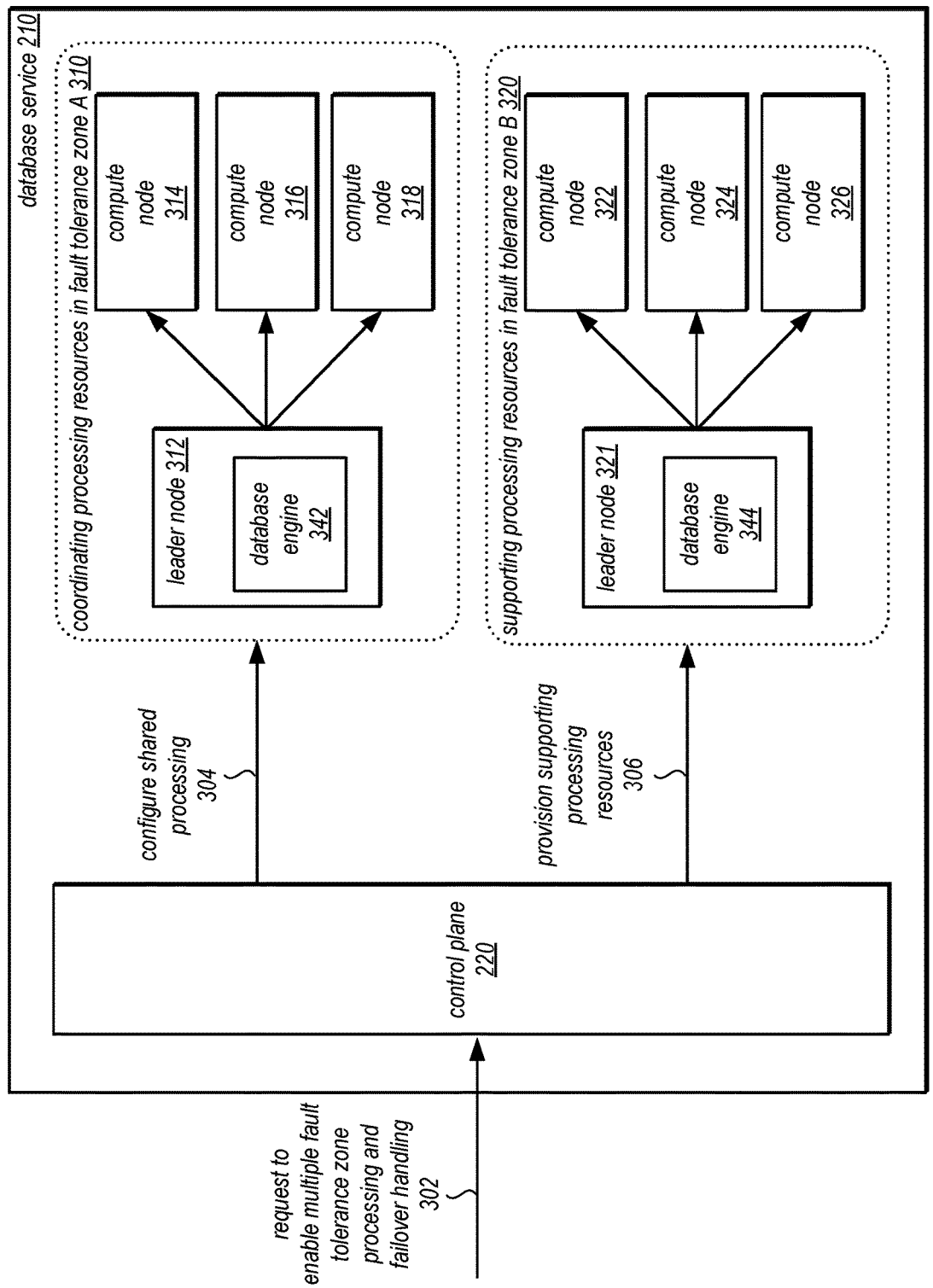
FIG. 3 is a logical block diagram of provisioning supporting processing resources in a different fault tolerance zone to enable shared processing of access requests and enable failover handling for databases managed by the database service, according to some embodiments.

FIG. 3 is a logical block diagram of provisioning supporting processing resources in a different fault tolerance zone to enable shared processing of access requests and enable failover handling for databases managed by the database service, according to some embodiments. As indicated at 302, a request to enable request to enable multiple fault tolerance zone processing and failover handling may be received by the control plane 220. Upon receipt of the request to enable request to enable multiple fault tolerance zone processing and failover handling, the control plane may provision supporting processing resources (e.g., a cluster) to be attached in a different fault tolerance zone to a managed database. For example, the control plane 220 may provision supporting processing resources 306 as reserved, allocated, permanent, or otherwise dedicated processing resources that store and/or provide access to the database for a client that is analogous to a coordinating processing resources in fault tolerance zone A 310. The supporting processing resources in fault tolerance zone B 320 may be associated with the coordinating processing resources in fault tolerance zone A 310 to provide shared processing 304 between processing cluster 310 and processing cluster 320, each of which may have respective leader nodes, 312 and 321, and compute nodes 314, 316, 318, 322, 324, and 526. While embodiments such as FIG. 3 herein are depicted as having a single leader node and three compute nodes, this is by way of example only and does not limit the configuration of coordinating or supporting processing nodes in any way. For example, the coordinating processing resources in fault tolerance zone A 310 may in some embodiments contain more than three compute nodes. It should be understood that the drawings and detailed description thereto are not intended to limit embodiments to the particular form disclosed, but on the contrary, the intention is to cover all modifications, equivalents, and alternatives.

Figure 4:
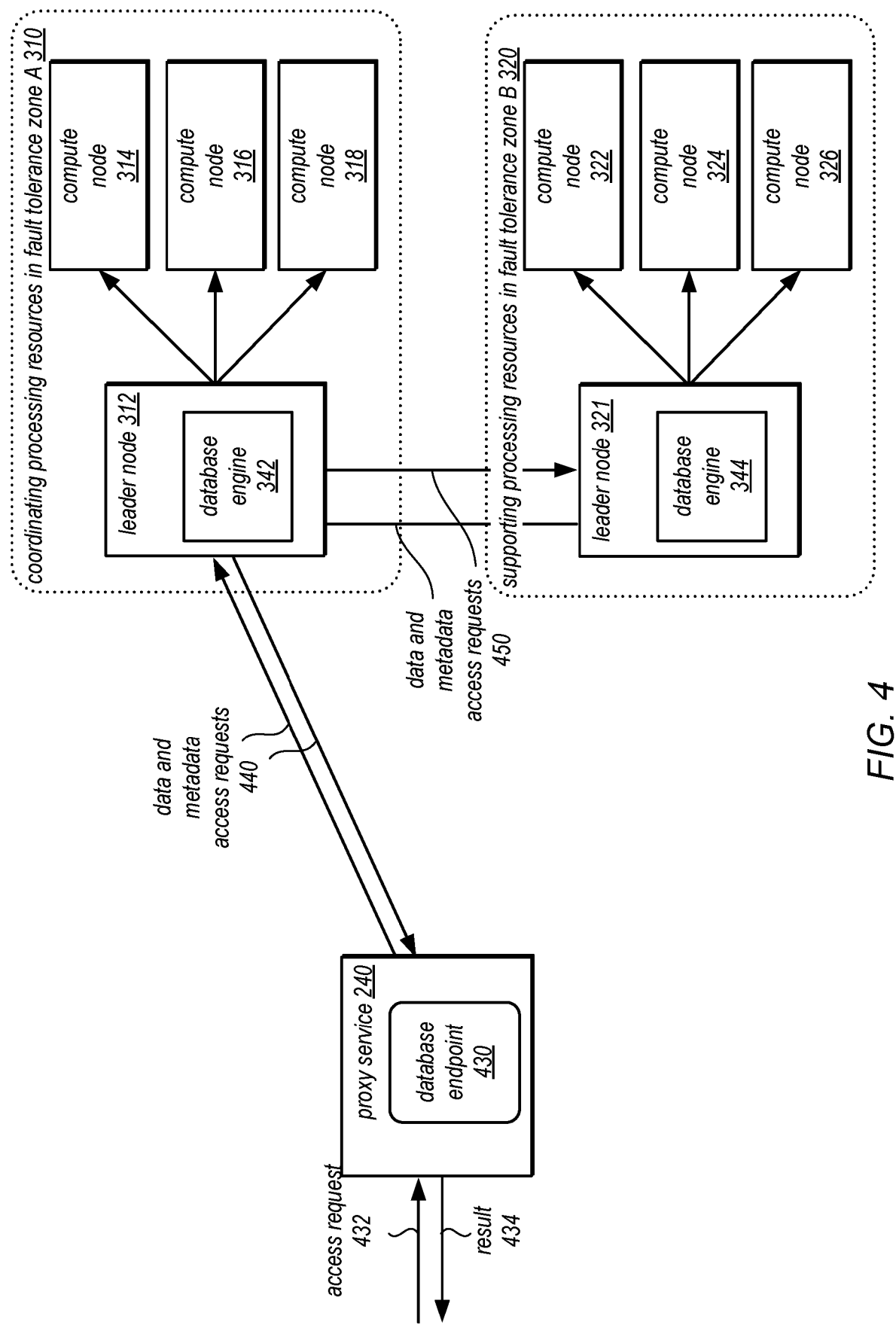
FIG. 4 is a logical block diagram illustrating an example of access request handling with resources in different fault tolerance zones for databases managed by the database service, according to some embodiments.

FIG. 4 is a logical block diagram illustrating an example of access request handling with resources in different fault tolerance zones for databases managed by the database service, according to some embodiments. In some embodiments, the proxy service 240 may implement database endpoint 430 which may provide access to coordinating processing resources in fault tolerance zone A 310 which in turn supports shared access request processing between supporting processing resources in fault tolerance zone B 320, each of which may have respective leader nodes, 312 and 321, and compute nodes 314, 316, 318, 322, 324, and 326.

Coordinating processing resources in fault tolerance zone A 310 may still provide access to the managed database even though coordinating processing resources in fault tolerance zone B 320 is unknown. For example, access requests, such as access request 432 can be accepted and routed either to the coordinating processing resources (as leader node 312 can answer metadata queries 440 about the managed database), or either data or metadata queries 430 can be sent to supporting processing resources 420 and answered by leader node 422. A result 434 can then be returned in response. Access requests may write, insert, modify, or delete data and returned as the result 434.

Figure 5:
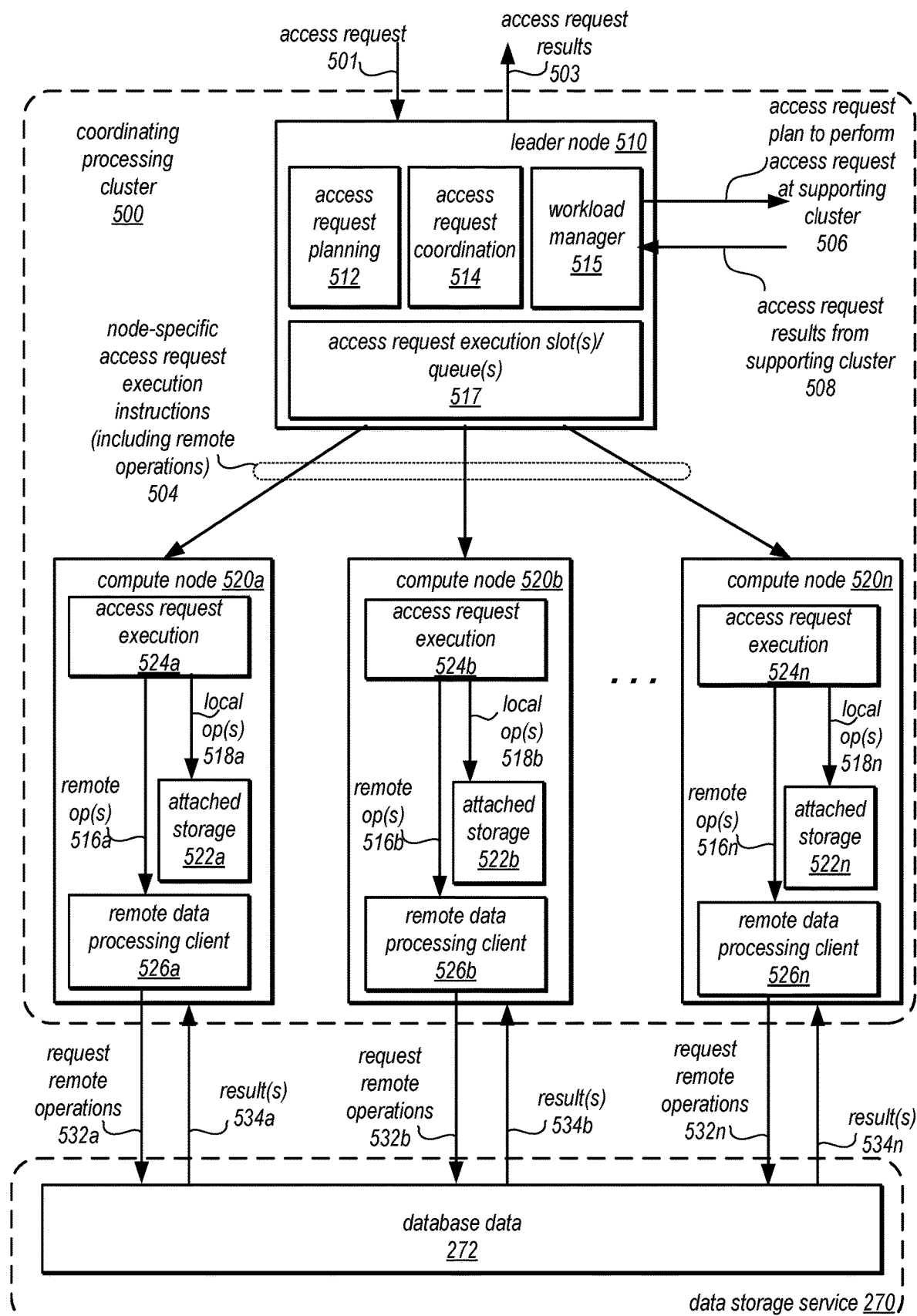
FIG. 5 is a logical block diagram illustrating an example coordinating processing resources of a database service that implements dynamically assigning access requests to supporting processing resources for shared processing of access requests, according to some embodiments.

FIG. 5 is a logical block diagram illustrating an example coordinating processing resources of a database service that implements dynamically assigning access requests to supporting processing resources for shared processing of access requests, according to some embodiments. Coordinating processing cluster 500 may be data warehouse service cluster, like processing clusters 320 discussed above with regard to FIG. 3, or another processing cluster that distributes execution of an access request among multiple processing nodes. As illustrated in this example, a coordinating processing cluster 500 may include a leader node 510 and compute nodes 520a, 520b, and 520n, which may communicate with each other over an interconnect (not illustrated). Leader node 510 may implement access request planning 512 to generate access request plan(s), access request execution 514 for executing access requests on coordinating processing cluster 500 that perform data processing that can utilize remote access request processing resources for remotely stored data (e.g., by utilizing one or more access request execution slot(s)/queue(s) 517) and workload manager 515 for selecting, routing, directing, or otherwise causing a received access request to be performed using supporting capacity resources, such as a supporting processing cluster 600 in FIG. 6 discussed below. As described herein, each node in a coordinating processing cluster 500 may include attached storage, such as attached storage 522a, 522b, and 522n, on which a database (or portions thereof) may be stored on behalf of clients (e.g., users, client applications, and/or storage service subscribers).

Note that in at least some embodiments, access request processing capability may be separated from compute nodes, and thus in some embodiments, additional components may be implemented for processing access requests. Additionally, it may be that in some embodiments, no one node in processing cluster 500 is a leader node as illustrated in FIG. 5, but rather different nodes of the nodes in processing cluster 500 may act as a leader node or otherwise direct processing of access requests to data stored in processing cluster 500. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, coordinating processing cluster 500 may be implemented as part of a data warehouse service, as discussed above with regard to FIG. 3, or another one of data processing service(s) 210. Leader node 510 may manage communications with clients, such as clients 250 discussed above with regard to FIG. 2. For example, leader node 510 may be a server that receives a access request 501 from various client programs (e.g., applications) and/or subscribers (users), then parses them and develops an execution plan (e.g., access request plan(s)) to carry out the associated database operation(s)). More specifically, leader node 510 may develop the series of steps necessary to obtain results for the access request. Access request 501 may be directed to data that is stored both locally within processing cluster 500 (e.g., at one or more of compute nodes 520) and data stored remotely (which may be accessible by data retrieval service 220). Leader node 510 may also manage the communications among compute nodes 520 instructed to carry out database operations for data stored in the processing cluster 500. For example, node-specific access request instructions 504 may be generated or compiled code by access request execution 514 that is distributed by leader node 510 to various ones of the compute nodes 520 to carry out the steps needed to perform access request 501, including executing the code to generate intermediate results of access request 501 at individual compute nodes may be sent back to the leader node 510. Leader node 510 may receive data and access request responses or results from compute nodes 520 in order to determine a final result 503 for access request 501. A database schema, data format and/or other metadata information for the data stored among the compute nodes, such as the data tables stored in the cluster, may be managed and stored by leader node 510. Access request planning 512 may account for remotely stored data by generating node-specific access request instructions that include remote operations to be directed by individual compute node(s). As discussed in more detail below with regard to FIG. 7, a leader node may implement workload manager 515 to send 506 a access request plan generated by access request planning 512 to be performed at a supporting processing cluster and return results 508 received from the supporting processing cluster to a client as part of results 503. In this way, supporting access request processing may occur without client application changes to establish a separate connection or communication scheme with supporting processing resources, allowing for seamless scaling between coordinating and supporting processing capacity.

Processing cluster 500 may also include compute nodes, such as compute nodes 520a, 520b, and 520n. Compute nodes 520, may for example, be implemented on servers or other computing devices, such as those described below with regard to computer system 2000 in FIG. 14, and each may include individual access request processing "slices"

defined, for example, for each core of a server's multi-core processor, one or more access request processing engine(s), such as access request engine(s) 524*a*, 524*b*, and 524*n*, to execute the instructions 504 or otherwise perform the portions of the access request plan assigned to the compute node. Access request engine(s) 524 may access a certain memory and disk space in order to process a portion of the workload for a access request (or other database operation) that is sent to one or more of the compute nodes 520. Access request engine 524 may access attached storage, such as 522*a*, 522*b*, and 522*n*, to perform local operation(s), such as local operations 518*a*, 518*b*, and 518*n*. For example, access request engine 524 may scan data in attached storage 522, access indexes, perform joins, semi joins, aggregations, or any other processing operation assigned to the compute node 520.

Access request engine 524*a* may also direct the execution of remote data processing operations, by providing remote operation(s), such as remote operations 516*a*, 516*b*, and 516*n*, to remote data processing clients, such as remote data processing client 526*a*, 526*b*, and 526*n*. Remote data processing clients 526 may be implemented by a client library, plugin, driver or other component that sends request sub-access requests, such as sub-quer(ies) 532*a*, 532*b*, and 532*n* to data retrieval service 220. As noted above, in some embodiments, data retrieval service 220 may implement a common network endpoint to which request sub-quer(ies) 532 are directed, and then may dispatch the requests to respective processing nodes, such as processing nodes 540*a*, 540*b*, and 540*n*. Remote data processing clients 526 may read, process, or otherwise obtain results from processing nodes, including partial results of different operations (e.g., aggregation operations) and may provide sub-access request result(s), including result(s) 534*a*, 534*b*, and 534*c*, back to access request engine(s) 524, which may further process, combine, and or include them with results of location operations 518.

Compute nodes 520 may send intermediate results from access requests back to leader node 510 for final result generation (e.g., combining, aggregating, modifying, joining, etc.). Remote data processing clients 526 may retry remote operation request(s) 532 that do not return within a retry threshold. As data retrieval service 220 may be stateless, processing operation failures at processing node(s) 540 may not be recovered or taken over by other processing nodes 540, remote data processing clients 526 may track the success or failure of requested operation(s) 532 and perform retries when needed.

Attached storage 522 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column-oriented data formats or other data formats).

Figure 6:
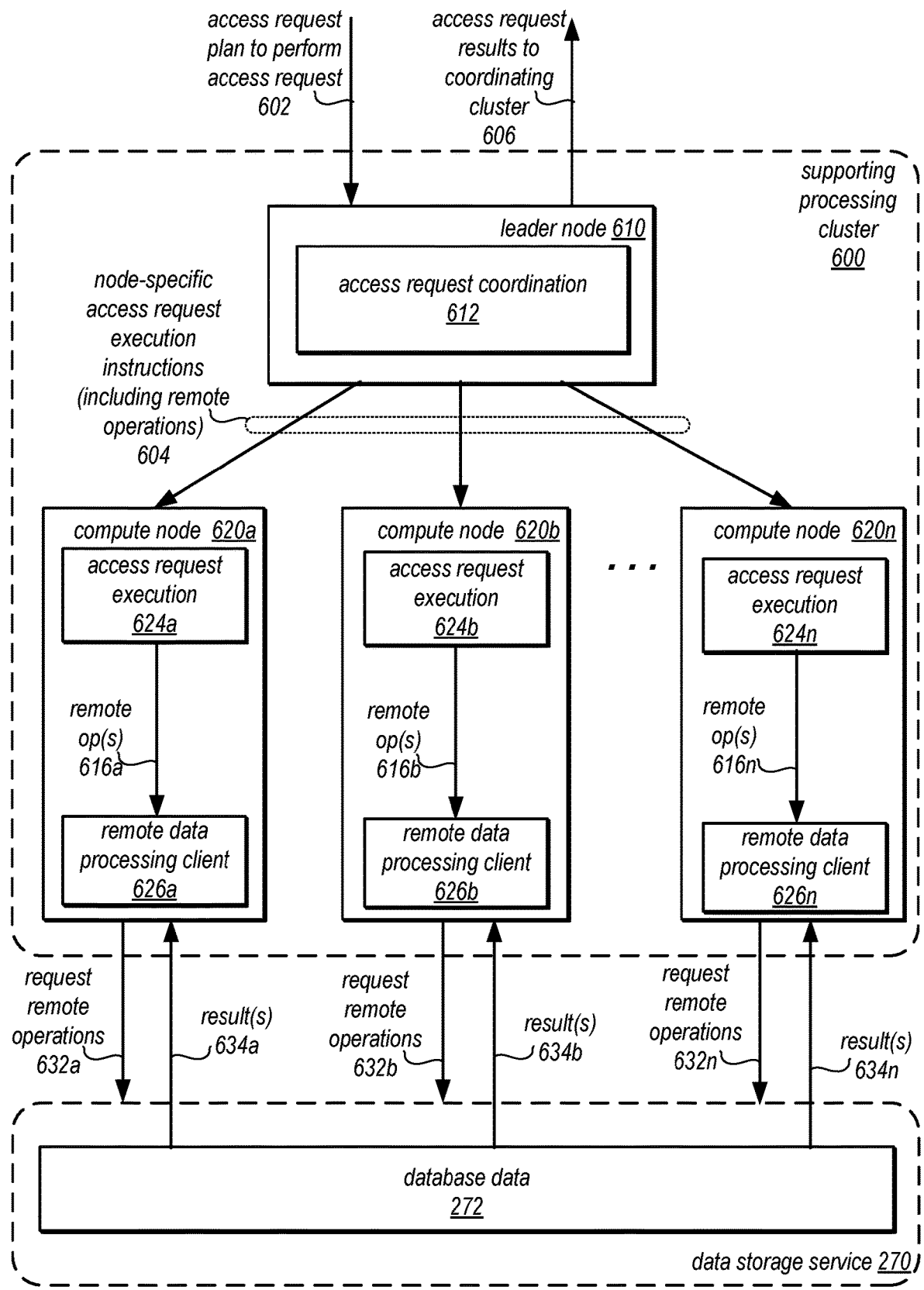
FIG. 6 is a logical block diagram illustrating an example supporting processing resources of a database service for shared processing of access requests, according to some embodiments.

FIG. 6 is a logical block diagram illustrating an example supporting processing resources of a database service for shared processing of access requests, according to some embodiments. Similar to coordinating processing cluster 500 in FIG. 5, supporting processing cluster 600 may include a leader node 610 and compute nodes 620*a*, 620*b*, and 620*n*, which may communicate with each other over an interconnect (not illustrated). Leader node 610 may implement access request execution 612 for executing access requests on supporting processing cluster 600. For example, leader node 610 may receive a access request plan 602 to perform a access request from a coordinating processing cluster. Access request execution 612 may generate the instructions or compile code to perform the access request according to the access request plan. Leader node 610 may also manage the communications among compute nodes 620 instructed to carry out database operations for data stored in the supporting processing cluster 600. For example, node-specific access request instructions 604 may be generated or compiled code by access request execution 612 that is distributed by leader node 610 to various ones of the compute nodes 620 to carry out the steps needed to perform access request plan 602, including executing the code to generate intermediate results of the access request at individual compute nodes may be sent back to the leader node 610. Leader node 610 may receive data and access request responses or results from compute nodes 620 in order to determine a final result 606 for the access request to be sent back to the coordinating processing cluster.

In at least some embodiments, supporting processing cluster 600 may not maintain a local copy of the database, but instead may access a backup of the database (or the database directly which may not be maintained locally at coordinating processing clusters) via data retrieval service 220. For example, access request engine 624*a* may direct the execution of remote data processing operations, by providing remote operation(s), such as remote operations 616*a*, 616*b*, and 616*n*, to remote data processing clients, such as remote data processing client 626*a*, 626*b*, and 626*n*, in order to retrieve data from the database data in object storage service 330 to perform the access request. As noted earlier, remote data processing clients 626 may be implemented by a client library, plugin, driver or other component that sends request sub-access requests, such as sub-quer(ies) 632*a*, 632*b*, and 632*n* to data retrieval service 220. As noted above, in some embodiments, data retrieval service 220 may implement a common network endpoint to which request sub-quer(ies) 632 are directed, and then may dispatch the requests to respective processing nodes, such as processing nodes 640*a*, 640*b*, and 640*n*. Remote data processing clients 626 may read, process, or otherwise obtain results from processing nodes, including partial results of different operations (e.g., aggregation operations) and may provide sub-access request result(s), including result(s) 634*a*, 634*b*, and 634*c*, back to access request engine(s) 624, which may further process, combine, and or include them with results of location operations 618. In at least some embodiments, processing nodes 640 may filter, aggregate, or otherwise reduce or modify data from the database backups used to perform the access request in order to lessen the data transferred and handled by supporting processing cluster 600, increasing the performance of the access request at supporting processing cluster 600. Although not illustrated in FIG. 6, some supporting processing clusters may implement local attached storage and local processing similar to coordinating processing cluster 500 in FIG. 5. For example, a supporting processing cluster that was scheduled for a period of time that exceeds some threshold value (e.g., greater than 1 hour) may read and store in persistent storage database data from the database data (e.g., directly or via data retrieval service 220), in some embodiments.

Although not illustrated in FIGS. 5 and 6, further communications between a coordinating processing cluster and supporting processing cluster may be implemented. For example, database metadata may be obtained at supporting processing cluster 600 from a database backup and then updated as updates are made at the coordinating processing cluster, in some embodiments, as discussed below with regard to FIG. 8. In some embodiments, compute nodes 620 (or leader node 610) may request data directly from compute nodes 520 in coordinating processing cluster 500), such as updated data blocks in a table of a database. In at least one embodiment, all of the data used to perform a access request may be obtained by compute nodes 620 from compute nodes 520 instead of utilizing data retrieval service 220 and a backup in a separate data store.

In at least some embodiments, supporting processing cluster 600 may be a single tenant resource, only performing supporting access requests for one database (or client or user account). In some embodiments, supporting processing cluster 600 may be a multi-tenant environment, handling supporting access requests for different databases, different user accounts and/or different clients. In such scenarios, security techniques to prevent data from being visible to unauthorized users may be implemented.

Figure 7:
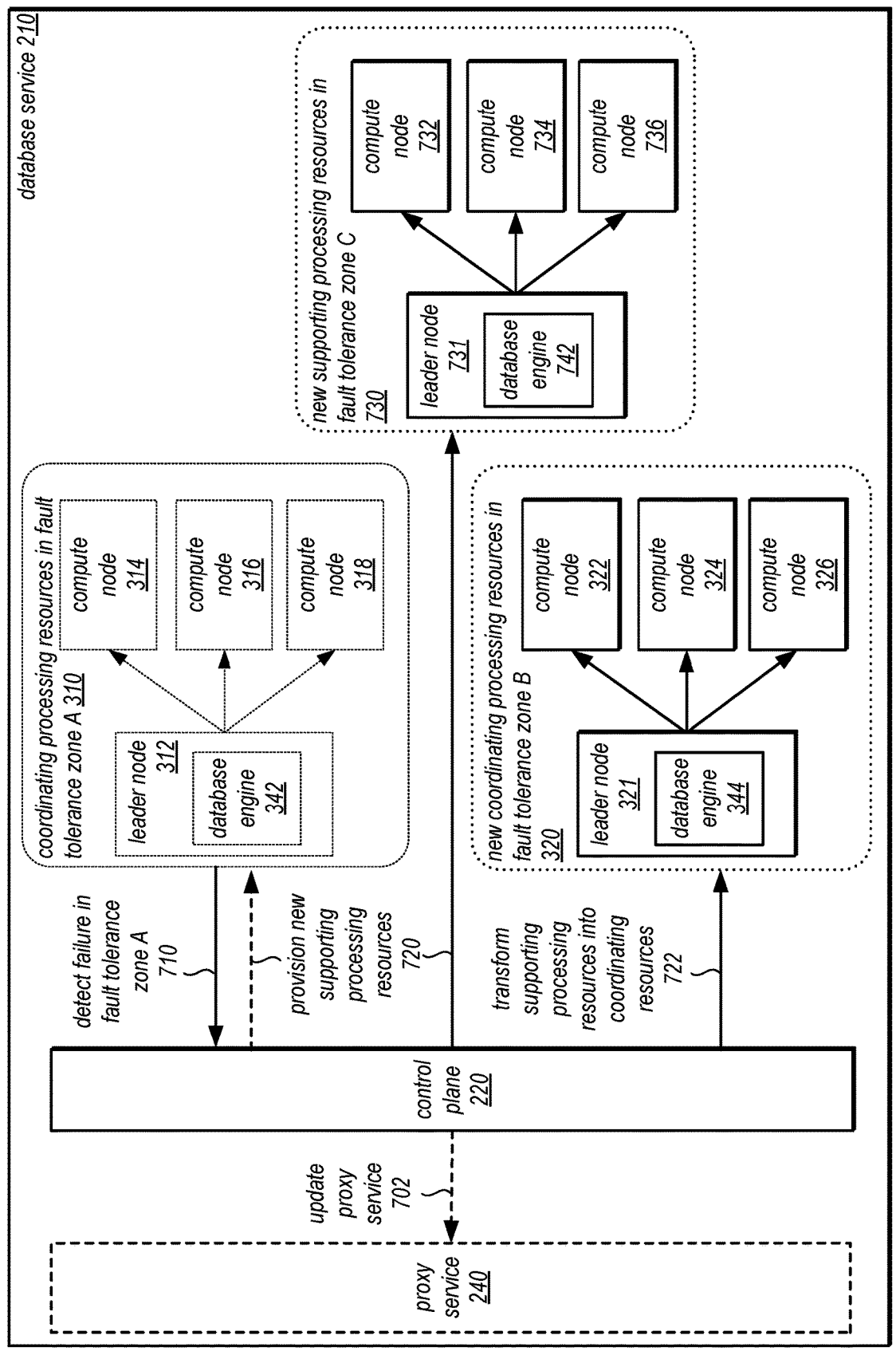
FIG. 7 is a logical block diagram illustrating an example of a failover handling of processing resources in different fault tolerance zones, according to some embodiments.
Figure 8:
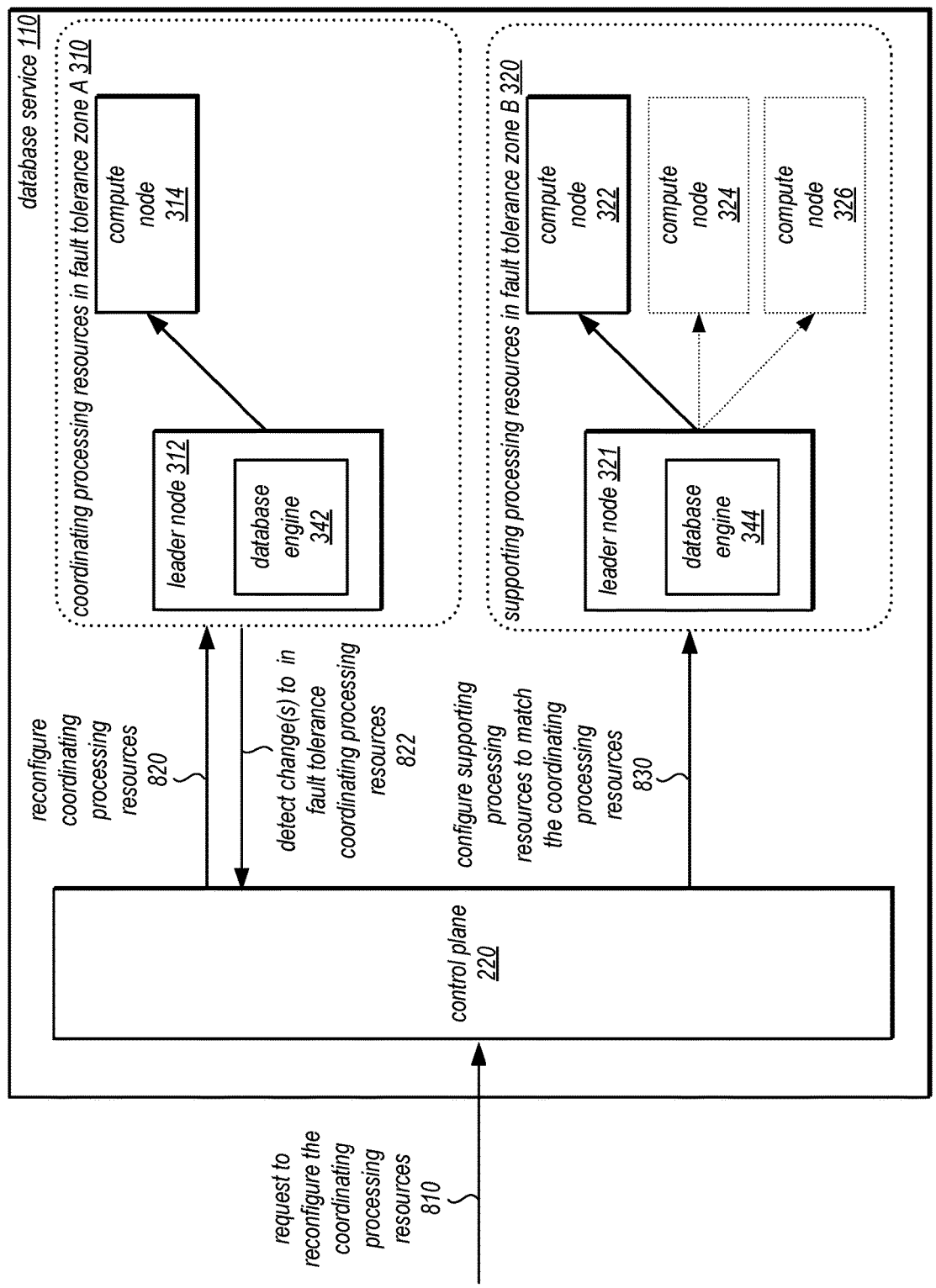
FIG. 8 is a logical block diagram illustrating an example of configuring supporting processing resources property to match the coordinating processing resources, according to some embodiments.

FIG. 7 is a logical block diagram illustrating an example of a failover handling of processing resources in different fault tolerance zones, according to some embodiments. As indicated at 702, upon detection that a failure in fault tolerance zone A 710 has occurred the control plane 220 may update the proxy service 702 to send access requests to a new coordinating processing resources in fault tolerance zone B 320. The control plane 220 may transform the supporting processing resources into coordinating resources 722 and configure the database engine 344 of the new coordinating processing resources in fault tolerance zone B 320 to receive all of the access requests. Moreover, upon determination that fault tolerance zone A remains unavailable, the control plane 220 may provision a new supporting processing resources in fault tolerance zone C 730 as a supporting processing resources for the one at fault tolerance zone B. The new supporting processing resources in fault tolerance zone C 730 may be associated with the new coordinating processing resources in fault tolerance zone B 320 to provide shared processing between processing cluster 320 and processing cluster 730, as illustrated in FIGS. 7-8, each of which may have respective leader nodes, 312 and 731, and compute nodes 322, 324, 526, 732, 734, and 736. In some embodiments, upon determination that fault tolerance zone A is available, the control plane 220 may transform and provision the new supporting processing resources in fault tolerance zone A 310 as a supporting processing resources for the one at fault tolerance zone B.

FIG. 8 is a logical block diagram illustrating an example of configuring supporting processing resources property to match the coordinating processing resources, according to some embodiments. Upon a request to request to reconfigure the coordinating processing resources 810 the control plane 220 may reconfigure coordinating processing resources 820 and/or detect change(s) to in fault tolerance coordinating processing resources 822. For example, the change to the coordinating processing resources in fault tolerance zone A 310 may be a reduction in the number of compute nodes. Upon the detection the control plane 822 may configure supporting processing resources to match the coordinating processing resources 830. For example, the supporting processing resources in fault tolerance zone B 320 may reduce the number of compute nodes 314 to match the coordinating processing resources in fault tolerance zone A 310. In some embodiments, the control plane 220 may detect a change in a first cryptographic key of a key management service for the coordinating processing resources in the fault tolerance zone A 310 and in response configure a second cryptographic key for the supporting processing resources in the fault tolerance zone B 320 to match the cryptographic key for the additional processing resources that has been changed. In some embodiments, changes such as arrangement of the processing resources in logically isolated virtual network may furthermore be detected and synchronized. Although FIGS. 2-8 have been described and illustrated in the context of a provider network implementing a database service, like a data warehousing service, the various components illustrated and described in FIGS. 2-8 may be easily applied to other database services that can utilize detecting idle periods for management actions at processing clusters for managed databases. As such, FIGS. 2-8 are not intended to be limiting as to other embodiments of detecting idle periods for management actions at processing clusters for managed databases.

Figure 9:
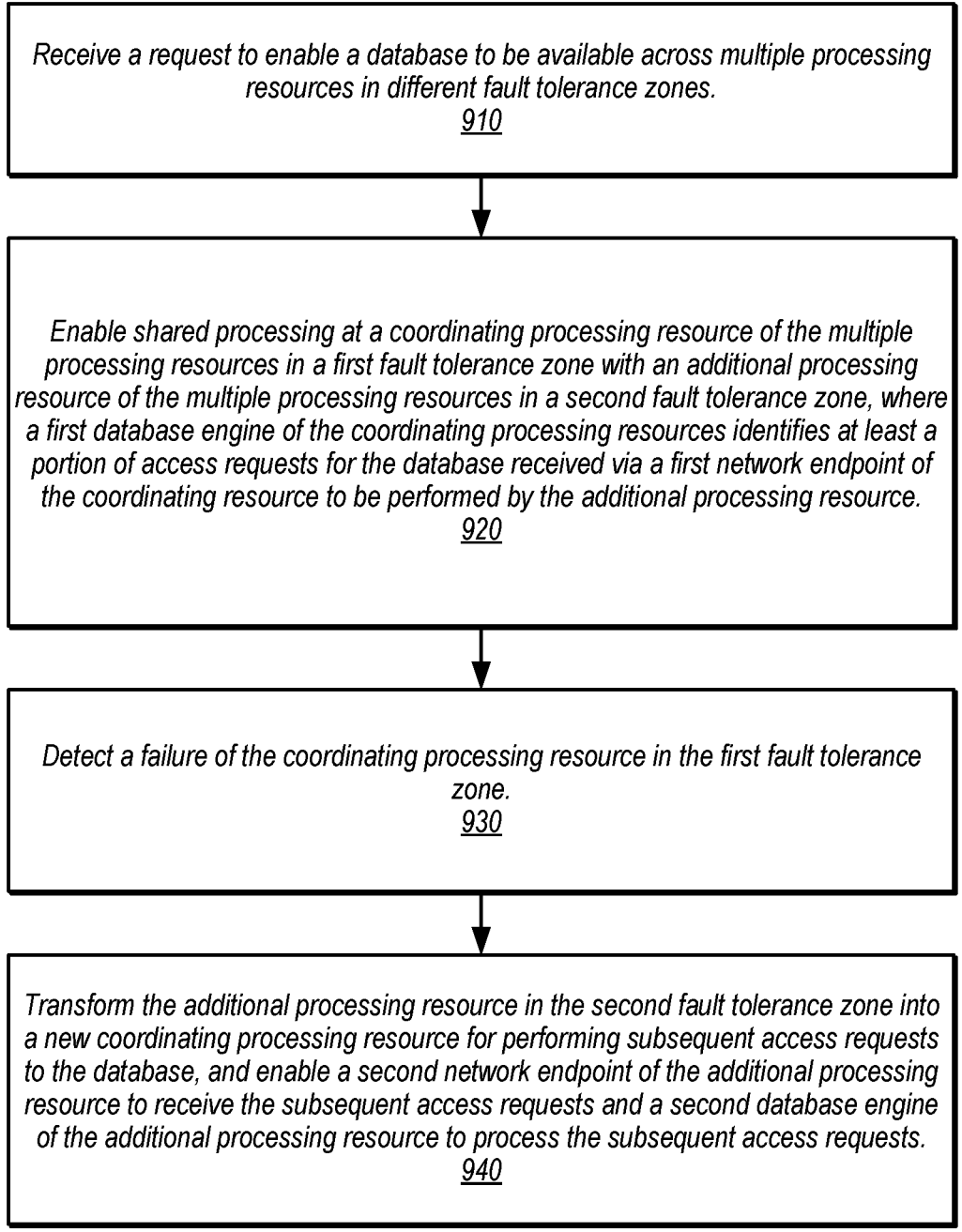
FIG. 9 is a high-level flowchart illustrating methods and techniques to enable provisioning supporting processing resources in a different fault tolerance zone to enable shared processing of access requests and enable failover handling for databases managed by the database service, according to some embodiments.

FIG. 9 is a high-level flowchart illustrating methods and techniques to enable provisioning supporting processing cluster in a different fault tolerance zone to enable shared processing of access requests and enable failover handling for databases managed by the database service, according to some embodiments. As indicated at 910, a request to enable a database to be configured in multiple processing resources in different fault tolerance zones may be received. For example, the request may be any of the various access requests, including write/update/store requests (e.g., to write data into storage) or queries for data (e.g., such as a Server Query Language request (SQL) for particular data), as discussed below with regard to FIG. 4.

As indicated at 920, coordinating processing resources in a first fault tolerance zone to be associated with additional processing resources in a second fault tolerance zone may be provisioned and may enable shared processing of at least a portion of access requests for the database received via a network endpoint of the coordinating resources to be performed by the additional processing resources. In some embodiments, a control plane of a database service may provision supporting processing resources as reserved, allocated, permanent, or otherwise dedicated processing resources that store and/or provide access to the database for a client that is analogous to a coordinating processing resources in fault tolerance zone as further discussed in FIG. 3.

As indicated at 930, a failure of the coordinating processing resources in the first fault tolerance zone may be detected, in some embodiments. As indicated at 940, the additional processing resources in the second fault tolerance zone may be transformed into new coordinating processing resources and may enable a new network endpoint of the additional processing resources to receive the access requests and a new database engine of the additional processing resources to process the access requests. In some embodiments, the transformation into the new coordinating processing resources may include a transformation from the supporting processing cluster as illustrated in FIG. 8 into the coordinating processing cluster as illustrated in FIG. 7.

Figure 10:
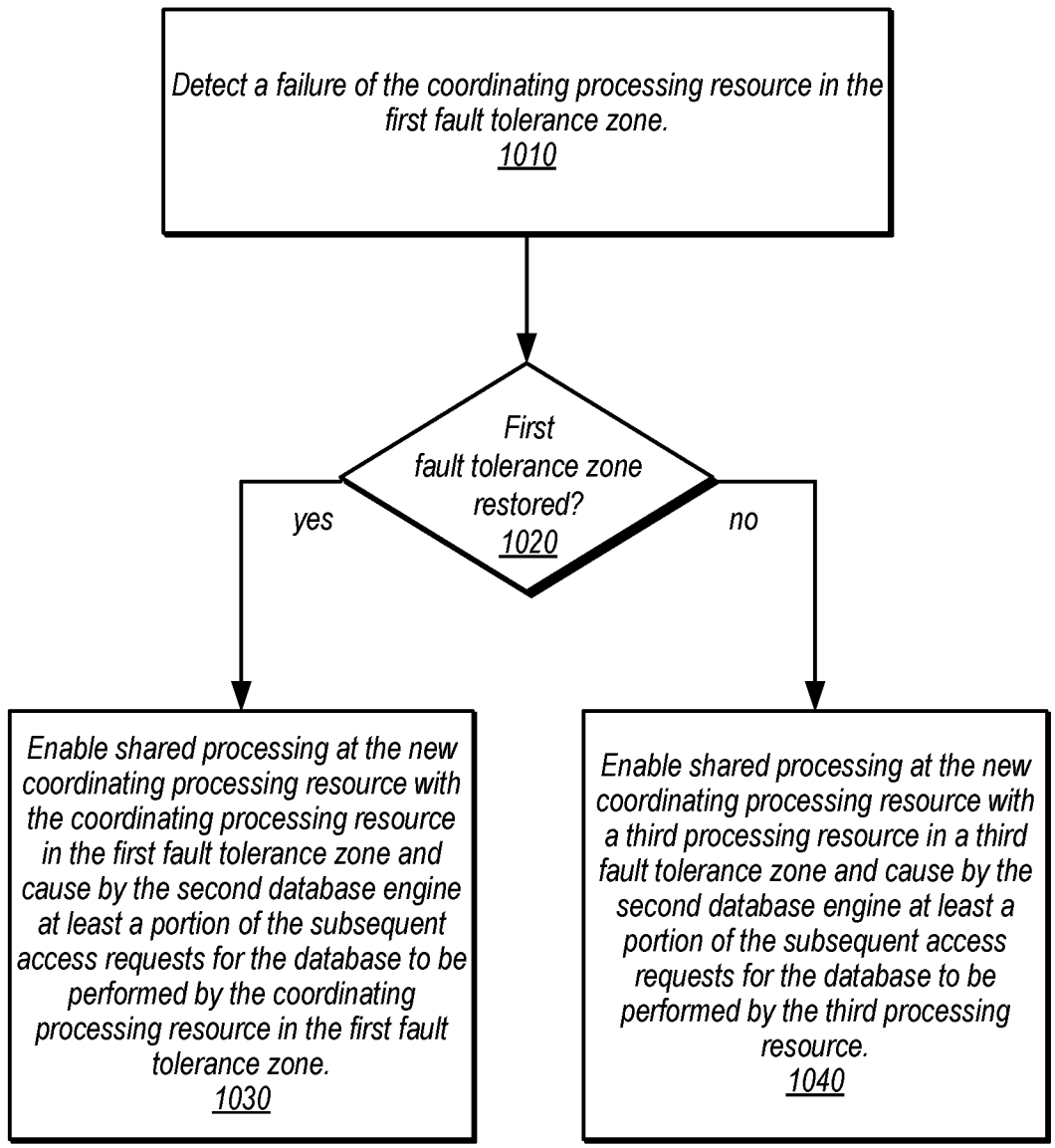
FIG. 10 is a high-level flowchart illustrating methods and techniques to implement provisioning a new database engine to enable shared processing to be performed by new supporting processing resources, according to some embodiments.

FIG. 10 is a high-level flowchart illustrating methods and techniques to implement provisioning a new database engine to enable shared processing to be performed by new supporting processing resources, according to some embodiments. As indicated at 1010, a failure of the coordinating processing resources in the first fault tolerance zone may be detected. As discussed in FIG. 2, the fault tolerance zone may be isolated failure domain including one or more data center facilities with separate power, separate networking, and separate cooling from those in another fault tolerance zone. In some embodiments, the fault tolerance zones within a region may be positioned far enough away from one other that the same natural disaster should not take more than one fault tolerance zone offline at the same time.

As indicated at 1020, a determination is made whether a fault tolerance zone restored. In some embodiments, the determination may be made after a threshold duration of time. In some embodiments the determination may be made even after another processing resources not in the first fault tolerance zone are associated.

As indicated at 1030, upon determination that the fault tolerance zone is restored, new coordinating processing resources to be associated with the coordinating processing resources in the first fault tolerance zone are provisioned. In some embodiments, the provisioning may include transformation from the coordinating processing cluster as illustrated in FIG. 7 into the supporting processing cluster as illustrated in FIG. 8.

As indicated at 1040, upon determination that the fault tolerance zone is not restored, new coordinating processing resources to be associated with another processing resources of the multiple processing resources in a third fault tolerance zone are provisioned. In some embodiments, a control plane of a database service may configure the new coordinating processing resources and/or the supporting processing resources in the third fault tolerance zone to shared processing between the clusters, as illustrated in FIGS. 7-8.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., provisioning supporting processing cluster in a different fault tolerance zone to enable shared processing of access requests and enable failover handling for databases managed by the database service described herein). The various methods as illustrated in the figures and described herein represent example embodiments of methods. The order of any method may be changed, and various elements may be added, reordered, combined, omitted, modified, etc.

Embodiments of provisioning supporting processing cluster in a different fault tolerance zone to enable shared processing of access requests and enable failover handling for databases managed by the database service as described herein may be executed on one or more computer systems, which may interact with various other devices. One such computer system is illustrated by FIG. 11. In different embodiments, computer system 1100 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1100 includes one or more processors 1111 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. Display(s) 1180 may include standard computer monitor(s) and/or other display systems, technologies or devices. In at least some implementations, the input/output devices 1150 may also include a touch- or multi-touch enabled device such as a pad or tablet via which a user enters input via a stylus-type device and/or one or more digits. In some embodiments, it is contemplated that embodiments may be implemented using a single instance of computer system 1100, while in other embodiments multiple such systems, or multiple nodes making up computer system 1100, may host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1111, or a multiprocessor system including several processors 1111 (e.g., two, four, eight, or another suitable number). Processors 1111 may be any suitable processor capable of executing instructions. For example, in various embodiments, processors 1111 may be general-purpose or embedded processors implementing any of a variety of instruction set architectures (ISAs), such as the x86, PowerPC, SPARC, or MIPS ISAs, or any other suitable ISA. In multiprocessor systems, each of processors 1111 may commonly, but not necessarily, implement the same ISA.

In some embodiments, at least one processor 1111 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1120 may store program instructions and/or data accessible by processor 1111. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1120 as program instructions 1125 and data storage 1135, respectively. In other embodiments, program instructions and/or data may be received, sent or stored upon different types of computer-accessible media or on similar media separate from system memory 1120 or computer system 1100. Generally speaking, a non-transitory, computer-readable storage medium may include storage media or memory media such as magnetic or optical media, e.g., disk or CD/DVD-ROM coupled to computer system 1100 via I/O interface 1130. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may coordinate I/O traffic between processor 1111, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1111). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. In addition, in some embodiments some or all of the functionality of I/O interface 1130, such as an interface to system memory 1120, may be incorporated directly into processor 1111.

Network interface 1140 may allow data to be exchanged between computer system 1100 and other devices attached to a network, such as other computer systems, or between nodes of computer system 1100. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or retrieving data by one or more computer system 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

Figure 11:
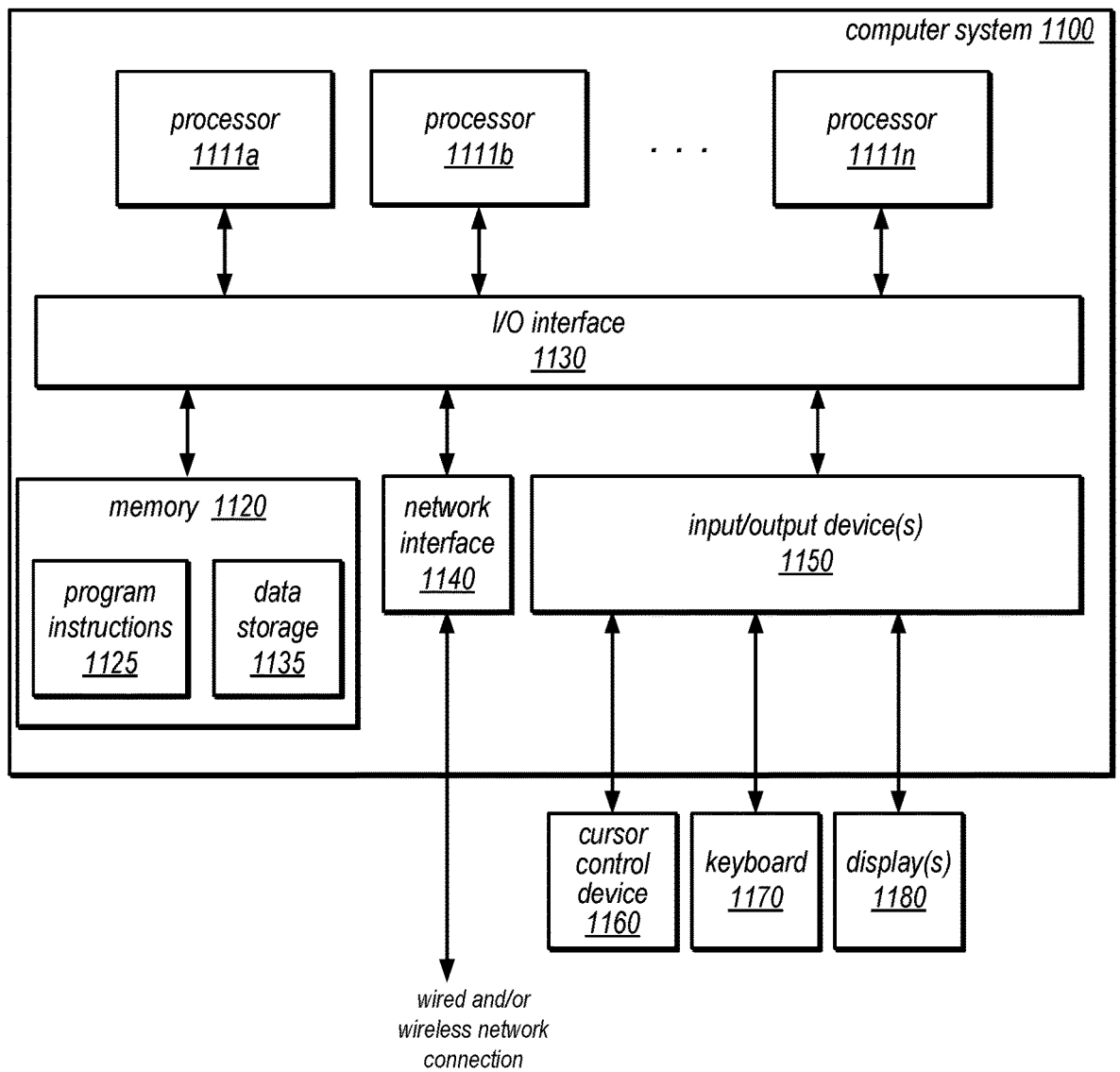
FIG. 11 illustrates an example system that implements the various methods, techniques, and systems described herein, according to some embodiments.

As shown in FIG. 11, memory 1120 may include program instructions 1125, that implement the various methods and techniques as described herein, and data storage 1135, comprising various data accessible by program instructions 1125. In one embodiment, program instructions 1125 may include software elements of embodiments as described herein and as illustrated in the Figures. Data storage 1135 may include data that may be used in embodiments. In other embodiments, other or different software elements and data may be included.

Those skilled in the art will appreciate that computer system 1100 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL))

corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   one or more computing devices, respectively comprising a processor and a memory that implement a database service, wherein the database service is configured to:
   receive a request to enable a database to be configured in multiple processing clusters in different fault tolerance zones;
   provision, based on the request, coordinating processing cluster of the multiple processing clusters in a first fault tolerance zone to be associated with additional processing cluster of the multiple processing clusters in a second fault tolerance zone, wherein a database engine of the coordinating processing cluster of the database is provisioned to enable shared processing of at least a portion of access requests for the database received via a network endpoint of the coordinating cluster to be performed by the additional processing cluster;
   detect a failure of the coordinating processing cluster in the first fault tolerance zone; and
   transform the additional processing cluster in the second fault tolerance zone into a new coordinating processing cluster, wherein to transform the additional processing cluster the database service is configured to:
   enable a new network endpoint of the additional processing cluster to receive the access requests and a new database engine of the additional processing cluster to process the access requests.

2. The system of claim 1, wherein the database service is further configured to:
   provision the new coordinating processing resources to be associated with another processing resources of the multiple processing resources in a third fault tolerance zone; and
   provision the new database engine to enable shared processing of the portion of the access requests for the database to be performed by the another processing resources.

3. The system of claim 1, wherein the database service is further configured to:
   subsequent to a resolution of the failure of the coordinating processing resources in the first fault tolerance zone, provision the new coordinating processing resources to be associated with the coordinating processing resources in the first fault tolerance zone; and
   provision the new database engine to enable shared processing of the portion of the access requests for the database to be performed by the coordinating processing resources.

4. The system of claim 1, wherein to provision the coordinating processing resources in the first fault tolerance zone, the database service is configured associate the coordinating processing resources with the additional processing resources in the second fault tolerance zone having an analogous processing resource topology as the coordinating processing resources.

5. The system of claim 1, wherein the database service is further configured to, upon detection of a change in a number of processing nodes of the coordinating processing resources in the first fault tolerance zone, configure the additional processing resources in the second fault tolerance zone to match the number of processing nodes for the additional processing resources.

6. A method, comprising:
   receiving a request to enable a database to be configured in multiple processing resources in different fault tolerance zones;
   provisioning, based on the request, coordinating processing resources of the multiple processing resources in a first fault tolerance zone to be associated with additional processing resources of the multiple processing resources in a second fault tolerance zone, wherein a database engine of the coordinating processing resources is provisioned to enable shared processing of at least a portion of access requests for the database received via a network endpoint of the coordinating resources to be performed by the additional processing resources;
   detecting a failure of the coordinating processing resources in the first fault tolerance zone; and
   transforming the additional processing resources in the second fault tolerance zone into new coordinating processing resources, wherein to transforming the additional processing resources comprises:
   enabling a new network endpoint of the additional processing resources to receive the access requests and a new database engine of the additional processing resources to process the access requests.

7. The method of claim 6, further comprising:
   provisioning the new coordinating processing resources to be associated with another processing resources of the multiple processing resources in a third fault tolerance zone; and
   provisioning the new database engine to enable shared processing of the portion of the access requests for the database to be performed by the another processing resources.

8. The method of claim 6, further comprising:
   subsequent to a resolution of the failure of the coordinating processing resources in the first fault tolerance zone, provisioning the new coordinating processing resources to be associated with the coordinating processing resources in the first fault tolerance zone; and
   provisioning the new database engine to enable shared processing of the portion of the access requests for the database to be performed by the coordinating processing resources.

9. The method of claim 6, wherein provisioning the coordinating processing resources in the first fault tolerance zone further comprises associating the coordinating processing resources with the additional processing resources in the second fault tolerance zone having an analogous processing resource topology as the coordinating processing resources.

10. The method of claim 6, further comprising, upon detection of a change in a number of processing nodes of the coordinating processing resources in the first fault tolerance zone, configuring the additional processing resources in the second fault tolerance zone to match the number of processing nodes for the additional processing resources.

11. The method of claim 6, upon detection of a change in a first cryptographic key of a key management service for the coordinating processing resources in the first fault tolerance zone, configuring a second cryptographic key for the additional processing resources in the second fault tolerance zone to match the cryptographic key for the additional processing resources that has been changed.

12. The method of claim 6, upon detection of a change in a logically isolated virtual network associated with the coordinating processing resources in the first fault tolerance zone, configuring the additional processing resources in the second fault tolerance zone to further reflect the change in the logically isolated virtual network for the additional processing resources.

13. The method of claim 6, wherein enabling a new network endpoint of the additional processing resources to receive the access requests comprises modifying a proxy service that first receives the access requests to the database to point to the new network endpoint.

14. One or more non-transitory, computer-readable storage media, storing program instructions that when executed on or across one or more computing devices cause the one or more computing devices to implement:
receiving a request to enable a database to be configured in multiple processing nodes in different fault tolerance zones;
provisioning, based on the request, coordinating processing nodes of the multiple processing nodes in a first fault tolerance zone to be associated with additional processing nodes of the multiple processing nodes in a second fault tolerance zone, wherein a database engine of the coordinating processing nodes is provisioned to enable shared processing of at least a portion of access requests for the database received via a network endpoint of the coordinating processing nodes to be performed by the additional processing nodes;
detecting a failure of the coordinating processing nodes in the first fault tolerance zone; and
transforming the additional processing nodes in the second fault tolerance zone into new coordinating processing nodes, wherein to transforming the additional processing nodes comprises:
enabling a new network endpoint of the additional processing nodes to receive the access requests and a new database engine of the additional processing nodes to process the access requests.

15. The one or more non-transitory, computer-readable storage media of claim 14, storing further instructions that when executed on or across the one or more computing devices, cause the one or more computing devices to implement:

provisioning the new coordinating processing nodes to be associated with another processing nodes of the multiple processing nodes in a third fault tolerance zone; and
provisioning the new database engine to enable shared processing of the portion of the access requests for the database to be performed by the another processing nodes.

16. The one or more non-transitory, computer-readable storage media of claim 14, storing further instructions that when executed on or across the one or more computing devices, cause the one or more computing devices to implement:
subsequent to a resolution of the failure of the coordinating processing nodes in the first fault tolerance zone, provisioning the new coordinating processing nodes to be associated with the coordinating processing nodes in the first fault tolerance zone; and
provisioning the new database engine to enable shared processing of the portion of the access requests for the database to be performed by the coordinating processing nodes.

17. The one or more non-transitory, computer-readable storage media of claim 14, wherein provisioning the coordinating processing nodes in the first fault tolerance zone further comprises associating the coordinating processing nodes with the additional processing nodes in the second fault tolerance zone having an analogous processing resource topology as the coordinating processing nodes.

18. The one or more non-transitory, computer-readable storage media of claim 14, storing further instructions that when executed on or across the one or more computing devices, cause the one or more computing devices to implement, upon detection of a change in a number of processing nodes of the coordinating processing nodes in the first fault tolerance zone, configuring the additional processing nodes in the second fault tolerance zone to match the number of processing nodes for the additional processing nodes.

19. The one or more non-transitory, computer-readable storage media of claim 14, storing further instructions that when executed on or across the one or more computing devices, cause the one or more computing devices to implement, upon detection of a change in a first cryptographic key of a key management service for the coordinating processing nodes in the first fault tolerance zone, configuring a second cryptographic key for the additional processing nodes in the second fault tolerance zone to match the cryptographic key for the additional processing nodes that has been changed.

20. The one or more non-transitory, computer-readable storage media of claim 14, storing further instructions that when executed on or across the one or more computing devices, cause the one or more computing devices to implement enabling a new network endpoint of the additional processing nodes to receive the access requests comprises modifying a proxy service that first receives the access requests to the database to point to the new network endpoint.

* * * * *